United States Patent
Im et al.

[19]

[11] Patent Number: 6,097,305

[45] Date of Patent: *Aug. 1, 2000

[54] DIALOGIC STYLE RF GUIDANCE SYSTEM FOR A VISUALLY HANDICAPPED PERSON AND ITS CONTROL METHOD

[75] Inventors: Jae-bong Im; Jeong-gi Kim; Hong-gu Jo, all of Seoul; Ha-ryeong Oh, Kyeonggi-do, all of Rep. of Korea

[73] Assignees: Korea Mobile Telecommunications Corp.; Kookmin University, both of Seoul, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/782,308

[22] Filed: Jan. 15, 1997

[30] Foreign Application Priority Data

Jan. 17, 1996 [KR] Rep. of Korea .......................... 96-845

[51] Int. Cl.⁷ ..................................................... H04Q 1/00
[52] U.S. Cl. ................................. 340/825.19; 340/825.69; 340/665; 340/825.49
[58] Field of Search .......................... 340/825.19, 825.49, 340/825.54, 539, 825.69, 665; 341/176

[56] References Cited

U.S. PATENT DOCUMENTS

| | | | |
|---|---|---|---|
| 4,194,194 | 3/1980 | Redfern | 340/665 |
| 4,253,083 | 2/1981 | Imanara | 340/825.19 |
| 4,660,022 | 4/1987 | Osaka | 340/539 |
| 5,032,836 | 7/1991 | Ono | 340/825.49 |
| 5,144,294 | 9/1992 | Alonzi | 340/825.19 |
| 5,461,371 | 10/1995 | Matsumoto | 340/825.49 |
| 5,623,248 | 4/1997 | Min | 340/665 |
| 5,754,115 | 5/1998 | Woo | 340/665 |

*Primary Examiner*—Brian Zimmerman
*Attorney, Agent, or Firm*—Dilworth & Barrese

[57] ABSTRACT

The dialogic style RF guidance system comprises multiple stationary base-sets established at the destination and the hand-held apparatus carried along by the visually handicapped people. This provides safe and efficient guidance to visually handicapped people in reaching their destinations, and more conveniently communicates with the base-set and simultaneously receives the message from the base-set through the microphones or external speakers.

15 Claims, 17 Drawing Sheets

DIALOGIC STYLE RF GUIDANCE SYSTEM FOR A VISUALLY HANDICAPPED PERSON AND ITS CONTROL METHOD

TECHNICAL FIELD

The present invention relates generally to the dialogic guidance system and its control method in guiding the visually handicapped people to their destinations. Generally, it is highly difficult for a visually handicapped person to reach the public facilities such as public institutions, bus stops, subway stations and the like, that they had to become passive in every aspect of their lives. Particularly, mass transportation facilities are too difficult to access for a handicapped person, and the present facilities for the handicapped are not only inefficient but sometimes even dangerous, although these facilities are essential for them.

In order to help visually handicapped people lead independent lives, it is desirable that a guidance system which can be conveniently employed in accessing and using public facilities be designed.

BACKGROUND OF THE ART

There have been some guidance systems designed for visually handicapped people such as automatic warning system which makes alarm sound when the obstacle is found before a handicapped person or when a guardian secedes handicapped person, burglar alarm systems and missing alarm systems.

However these conventional systems transport the message or information only one way reacting only on the outer conditions.

SUMMARY OF THE INVENTION

It is therefore an object of the invention to provide a system and its control method which can produce signals or messages in two ways, one side being the hadicapped person and the other side being the base-set, for the purpose of helping visually handicapped people utilize public transportation facilities safely and conveniently.

A further object of the invention is to provide a method for designing a transmission protocol that could be useful for the conventional dialogic style guidance system as well as to provide an error detection and correction techniques.

These and other objects of the invention will become more apparent from the following description.

The above object are realized by designing a dialogic style RF guidance system and its control method wherein the system is comprised of the stationary base-set established at the destination and the hand-held apparatus which can be carried along by the visually handicapped people, so that they can reach their destinations easily by communicating with the base-set and receiving messages from the base-set through microphones or external speakers. More particularly, the dialogic style guidance system is comprised of the stationary base-set which is established at the destination and the hand-held apparatus which is carried along by the visually handicapped people. The base-set produces information that guides handicapped people, in response to their requesting signal made from the hand-held apparatus which is carried along by the handicapped people. There could be multiple base-sets if needed. Preferably recommended are base-sets of buildings, bus stops, railway stations and crossings according to the function of the base-set. The hand-held apparatus would reproduce signal to the base-sets in a manner as described above, in order to receive the position information from the base-sets.

BRIEF DESCRIPTION OF DRAWINGS

A more complete understanding of the invention and many of the attendant thereto will be readily appreciated as the invention becomes better understood by reference to the following detailed description when considered in conjunction with the accompanying drawings wherein.

DESCRIPTION OF THE PREFERRED EMBODIMENT

Figure 1:
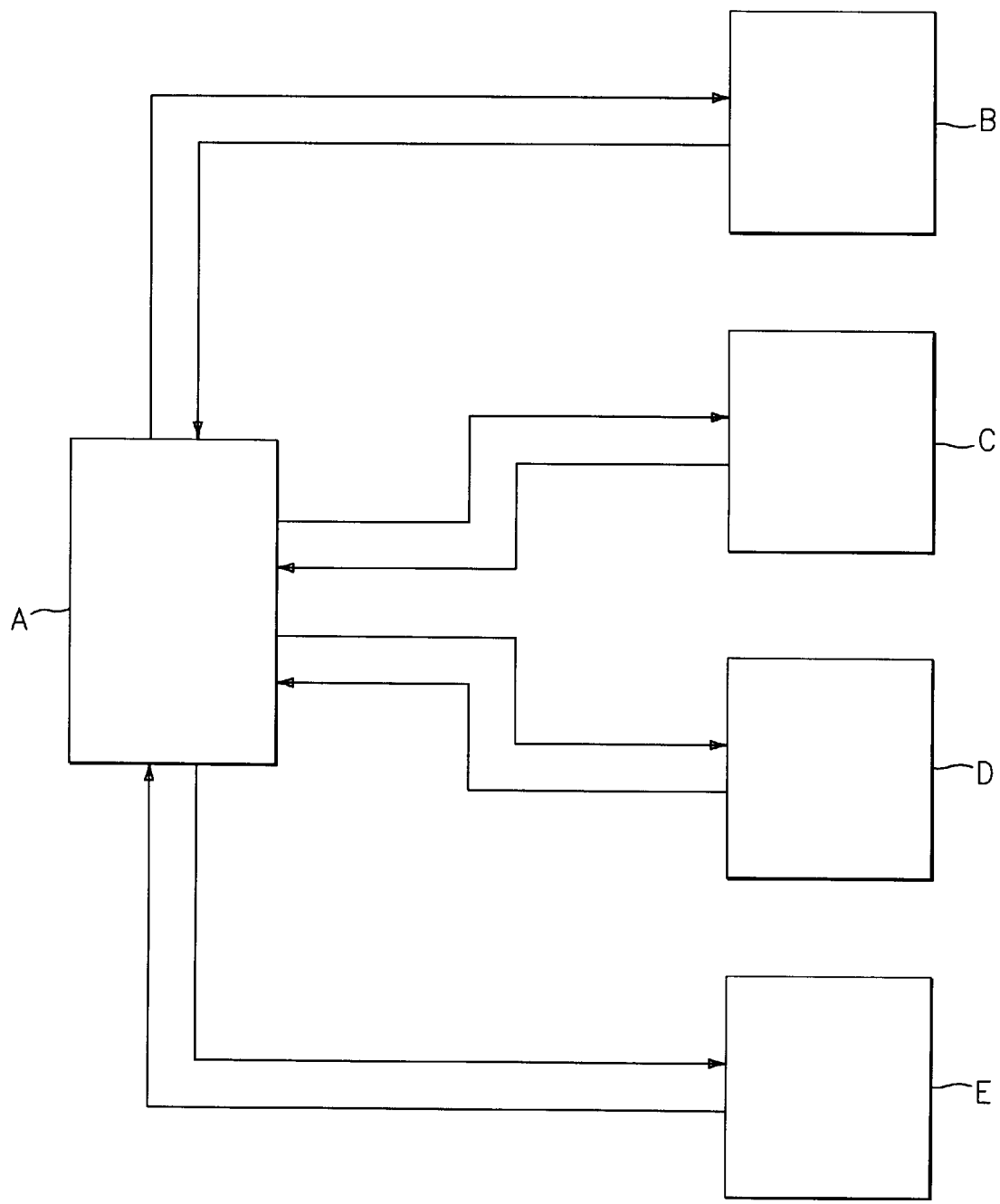
FIG. 1 is a block diagramic view of the overall dialogic style guidance system, showing multiple base-sets and the hand-held apparatus.

With reference to FIG. 1, the overall RF guidance system includes multiple base-sets B, C, D, E established at the destination and a hand-held apparatus carried along by a visually handicapped person. It is preferred that base-set B be established at the building where a handicapped person will go to, and base-set C, D, and E be at bus stops, railway stations and communication facilities, respectively.

Figure 2:
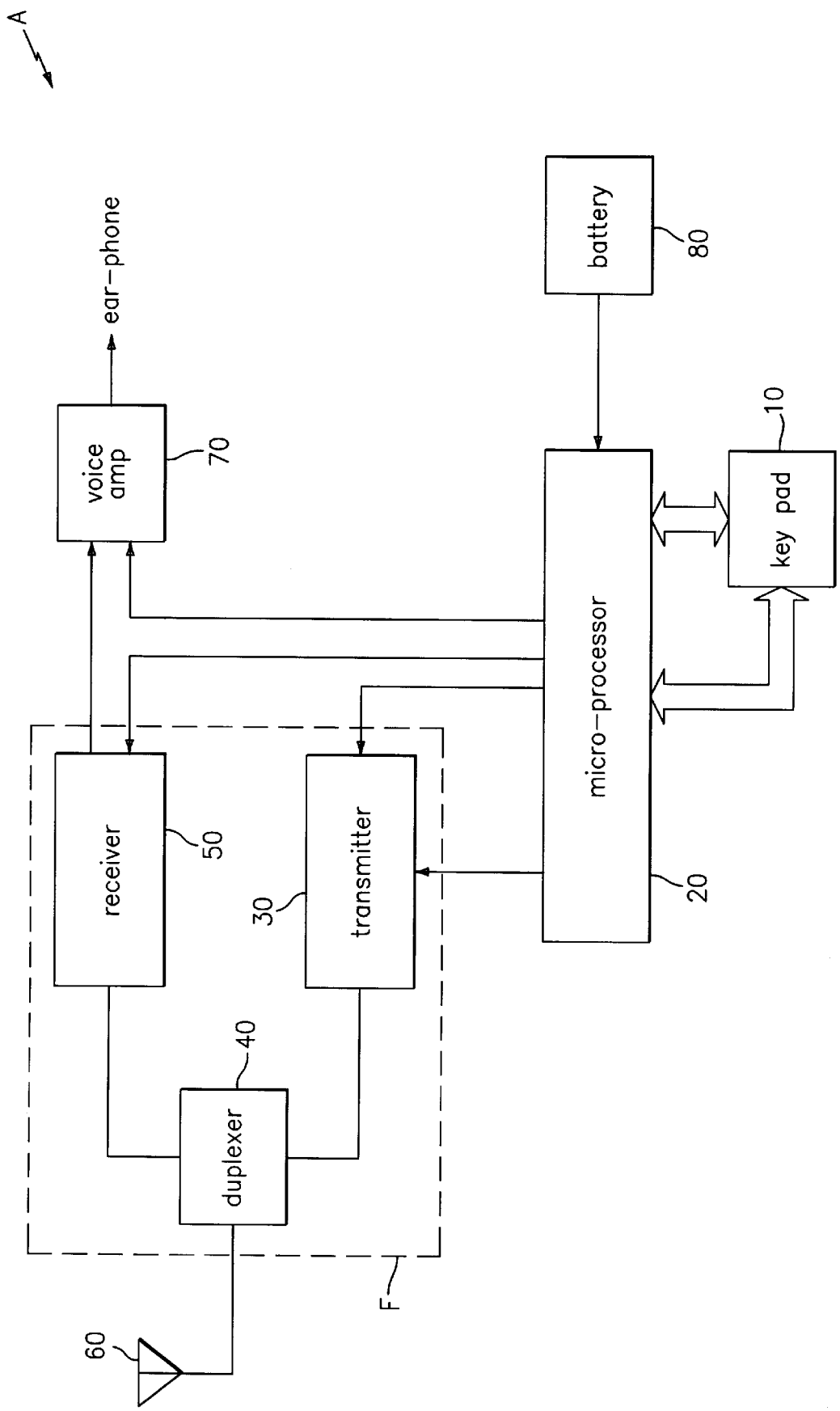
FIG. 2 is a block diagramic view of a hand-held apparatus.

What follows is an illustration of the hand-held apparatus with reference to FIG. 2, FIG. 3, FIG. 4a, FIG. 4b, FIG. 5, FIG. 6, FIG. 7, FIG. 8, and FIG. 9.:

Referring to FIG. 2, a preferred embodiment of hand-held apparatus has a keypad 10, a micro-processor 20, a RF module F, a transmission antenna 60, a voice amplifier 70 as well as a battery 80. The keypad 10 includes numeric keys and a few function keys enabling users, visually handicapped people, to manipulate those keys to demand micro-processor needed functions. A micro-processor will control overall operation of the apparatus in performing any function requested by a user. The transmission antenna sends a message to base-sets and receives response from base-sets. The RF module is composed of a transimitter 30 which will perform necessary processing in order to transmit the MSK (Minimum Shift Keying) signal produced by micro-processor 20, a duplexer 40 which duplexes the transmission signal and the received signal so that the interference could be avoided when using the same antenna for both transmission and reception purposes, and receiver 50 which processes the received signal from base-sets to make the sound come through voice amplifier 70. The Voice amplifier 70 amplifies the low level signal produced by the receiver so that the amplified voice signal can be heard by a user.

Figure 3:
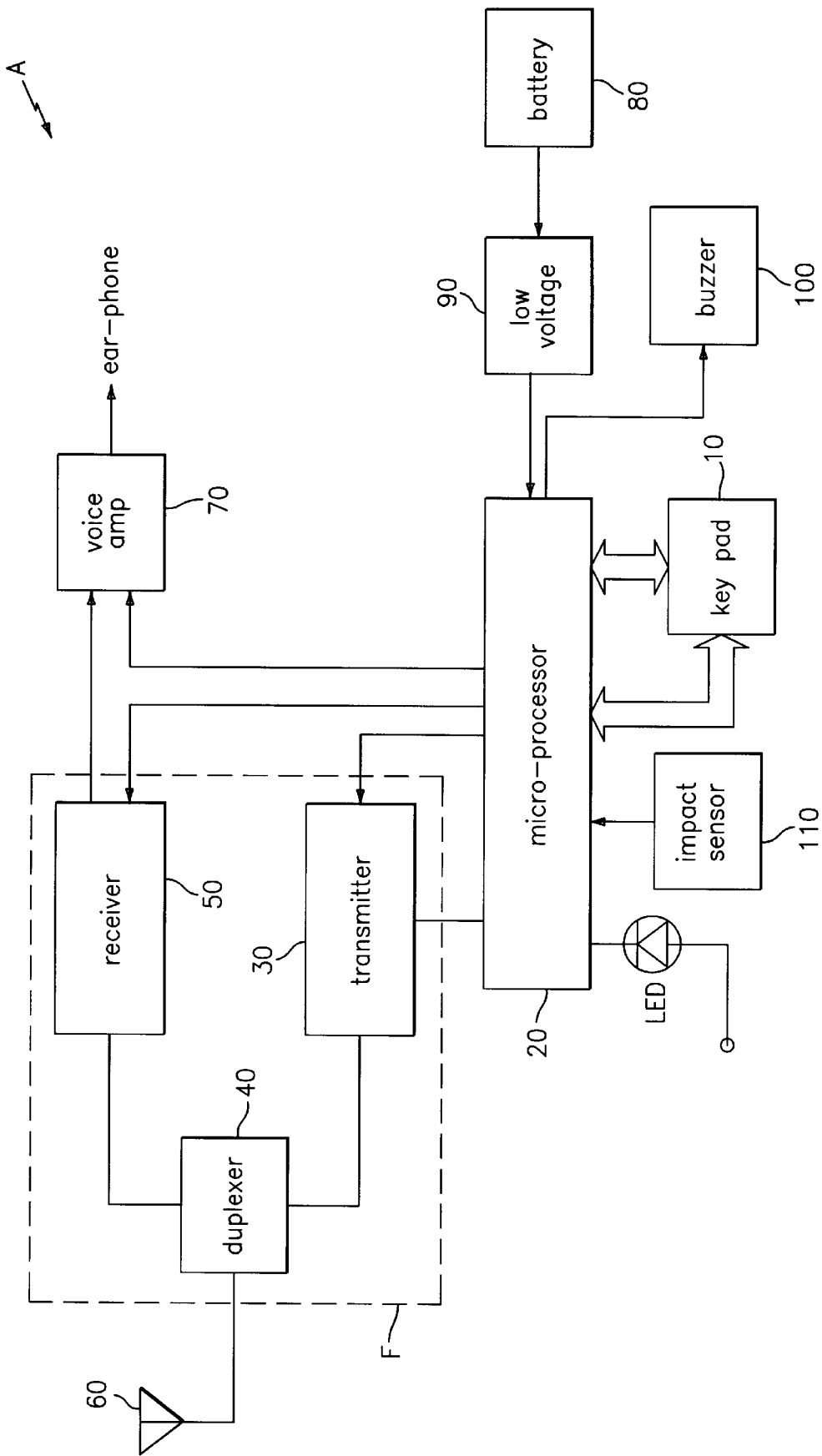
FIG. 3 is a block diagramic view of another examplary hand-held appratus.

Referring to FIG. 3, another preferred embodiment of a hand-held apparatus shall be illustrated.

The embodiment of a hand-held apparatus shown in FIG. 3 has all compositions of the hand-held apparatus explained previously, and includes additional part such as a low voltage sensor(90) which senses the low level voltage produced when the voltage supplied by the battery (80) drops under the proper level and an impact sensor (110) which senses the shock generated when the apparatus falls down to the ground, a buzzer (100) and a LED (Light Emission Diode) which notify the replacement time of the battery or apprise user that the apparatus has fallen down to the ground.

Figure 4A:
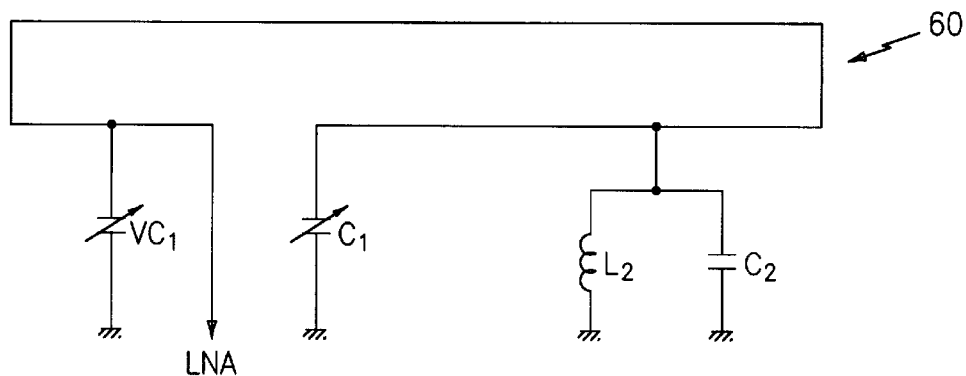
FIGS. 4a and 4b are diagramic views of an antenna circuit shown in FIG. 2 and 3 as 60.
Figure 4B:
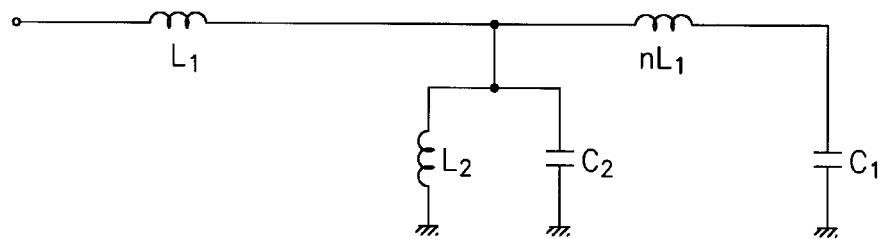
Figure 5:
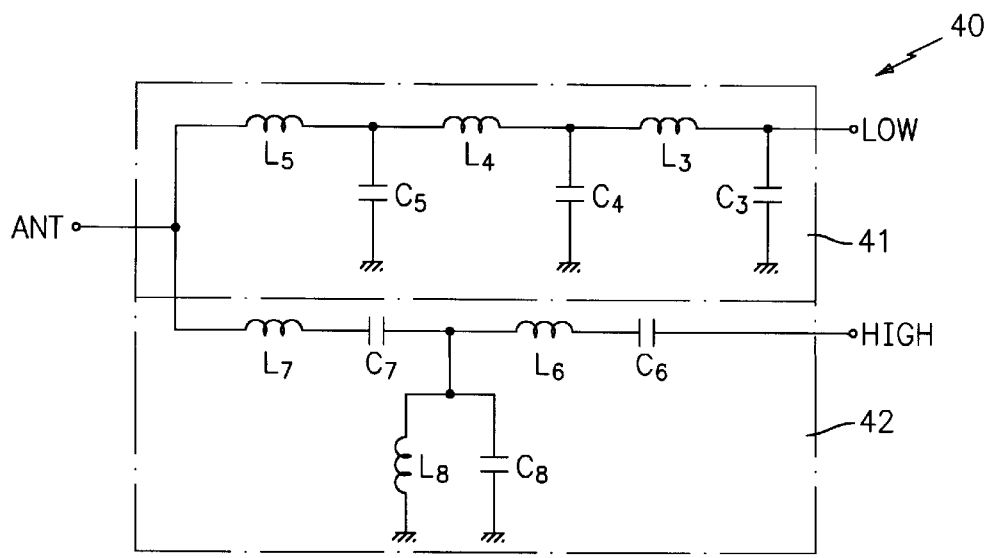
FIG. 5 is a diagramic view of a deplexer circuit shown in FIGS. 2 and 3 as 40.

Each compositions of the hand-held apparatuses illustrated in FIG. 3, FIG. 4*a* and FIG. 4*b* will be explained in more detailed manner:

Referring to FIG. 5, illustrated is the duplexer circuit 40 which is included in the RF module F as shown in FIG. 3, FIG. 4*a* and FIG. 4*b*. Despite that the general duplexer circuit is composed of low pass filter and band rejection filter or band pass filter and band rejection filter, the duplexer circuit 40 used in this apparatus has only a low pass filer 41 and a band pass filter 42, wherein the low pass filter 41 is connected to the receiver 50 and the band pass filter 42 to the transmitter 30.

Figure 6:
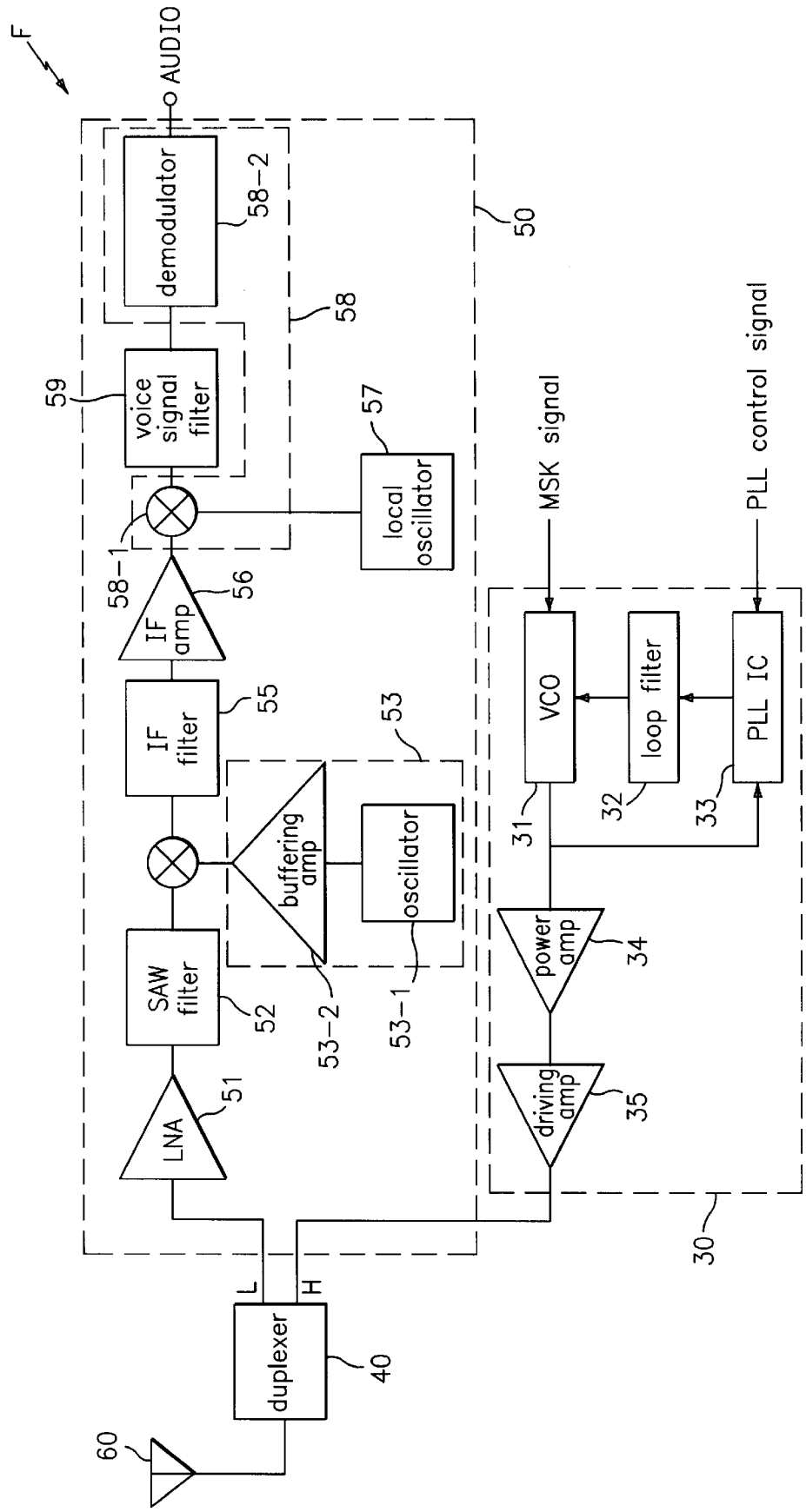
FIG. 6 is a block diagramic view of a RF module shown in FIG. 2 and 3 as F.
Figure 7:
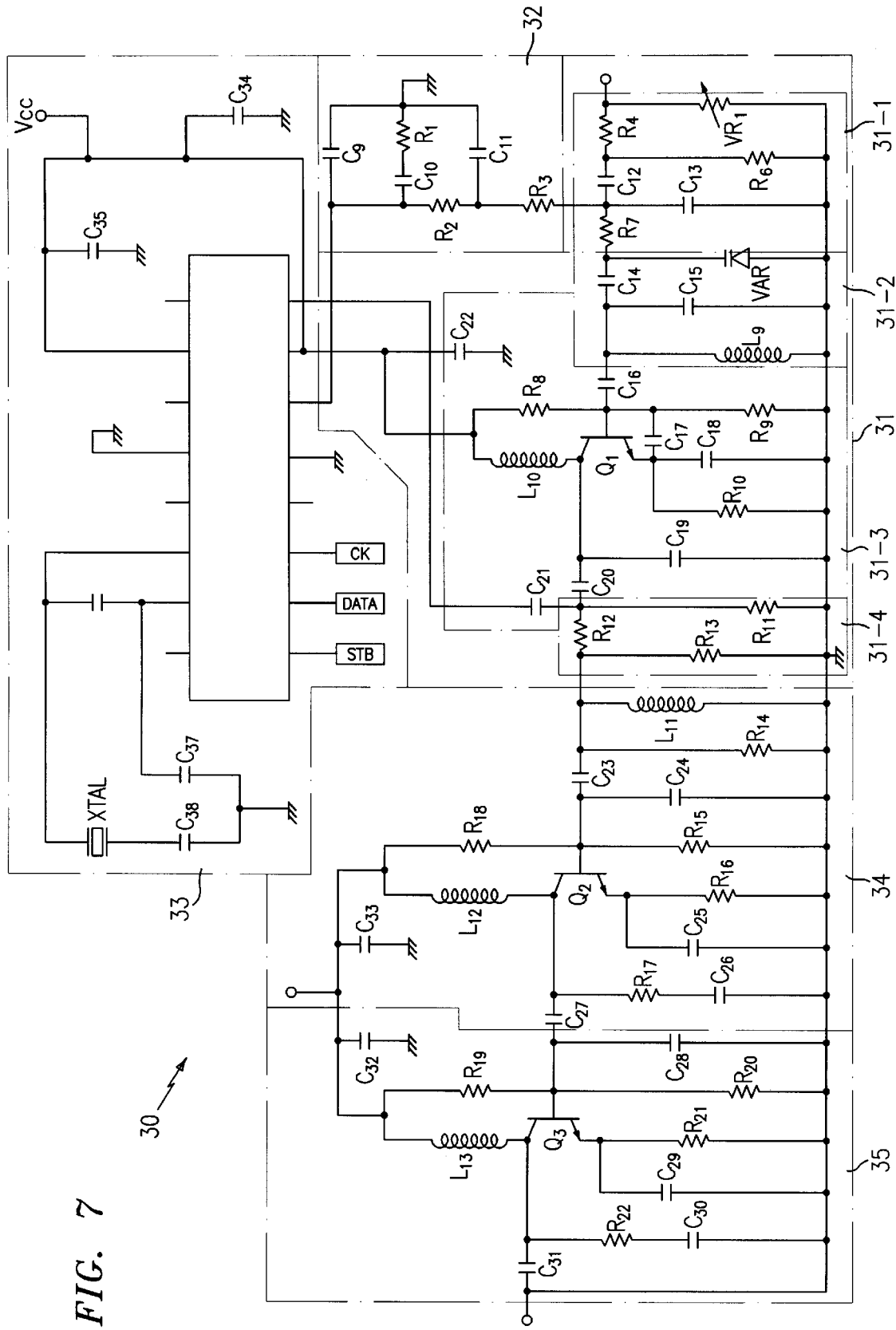
FIG. 7 is a diagramic view of a transmitter block shown in FIGS. 2 and 3 as 30.
Figure 8:
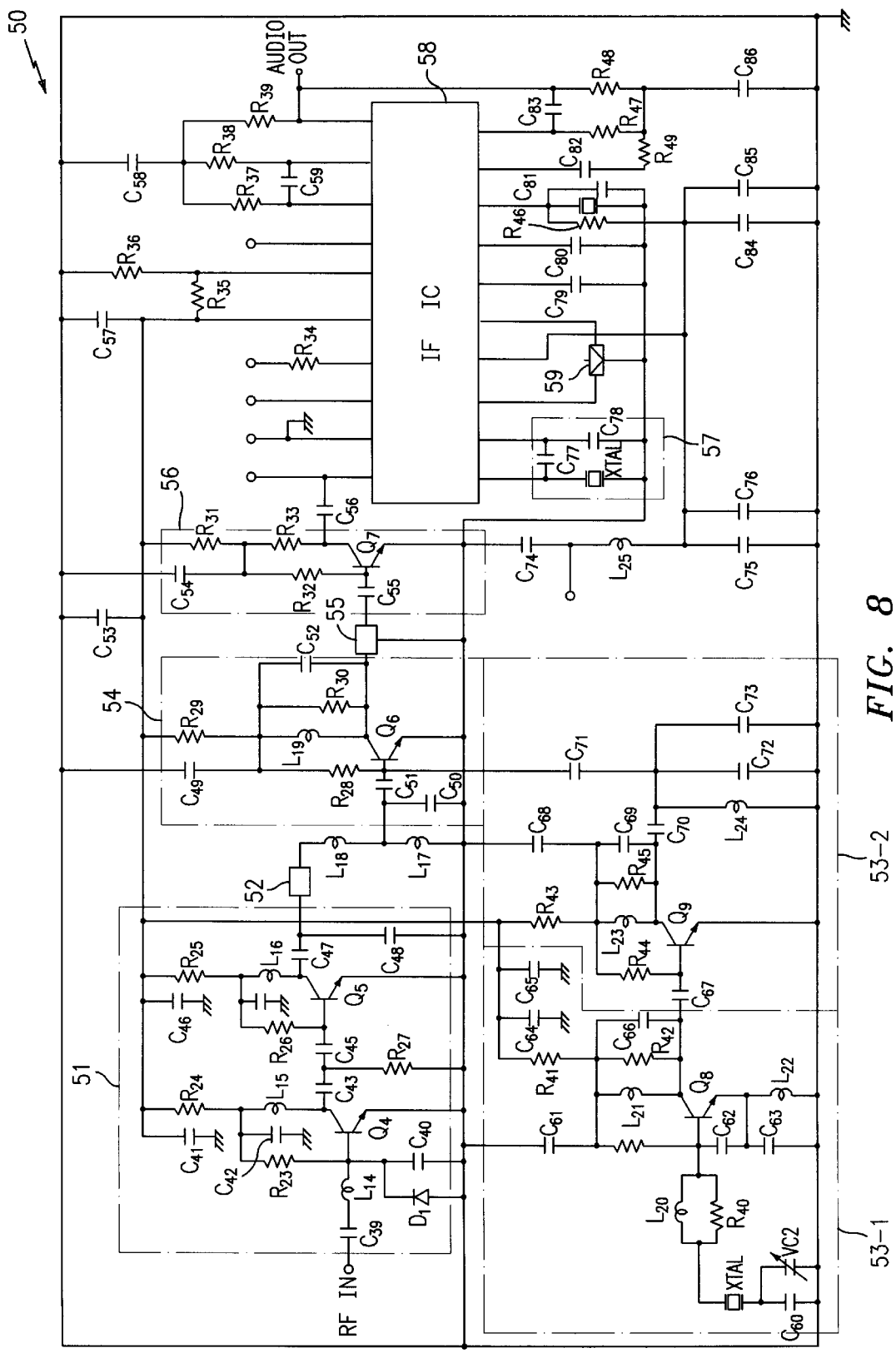
FIG. 8 is a diagramic view of a receiver block shown in FIGS. 2 and 3 as 50.

As shown in FIG. 6, the transmitter 30, being one component of the RF module F described in FIG. 3 and FIGS. 4*a* and 4*b* include PLL (Phase Locked Loop) IC 33 which compares the phase of signal produced from the VCO 31 to that of reference signal using the information provided by the micro-processor 20 to output that signal onto loop filter, loop filter 32 which outputs the signal onto the VCO 31 rejecting the high frequency signal produced when the output of PLL IC 33 variates abruptly, voltage controlled oscillator (VCO) 31 whose frequency is controlled by output signal frequency of PLL IC 33, driving amplifier 34 which amplifies the signal to a specific level, and a power amplifier 35 which amplifies that signal to a desired level high enough to be transmitted. Illustrating the transmitter 30 in more detailed manner with reference to FIG. 7, the VCO 31 is composed of attenuator 31-1, resonance circuit 31-2, oscillator 31-3 and attenuator 31-4; Wherein the attenuator 31-1, attenuating MSK signal to proper level, has variable resistance VR1, resistances R4 R6, high frequency rejection capacitor C12, blocking capacitor C13, and isolator resistance R7; The resonance circuit 31-2 produces resonant signal whose frequency is determined by varactor VAR, capacitors C14 C15 and reactor L9; The oscillator 31-3 has transistor Q1 which amplifies the ouput signal of the above mentioned oscillator 31-2, resistances R8 R9 R10 by which the transistor Q1 is biased, bypass capacitor C17 C18, choke coil L10 which rejects signal having higher frequency than the proper one, capacitor C22 rejecting high frequency signal which is not filtered out by the choke coil L10, and blocking capacitors C16 C19 C20 C21; The attenuator 31-4 comprises 3 resistances R11, R12, and R13 which adjust the output level of the oscillator 31-3. The driving amplifier 34 consists of coil L11, capacitors C23 C24 by which the matching with VCO 31 is performed, resistance R14 which stabilizes the transistor Q2, transistor Q1 which amplifies the output signal of the VCO 31, resistances R15 R16 R18 by which the transistor Q1 can be biased, bypass capacitor C25, resistance R17, capacitor C25 which adjusts the power level of signal driven to base of transistor Q3 in power amp 35 in order to prevent signal distortion resulting from the saturation of that transistor Q3, choke coil L12, capacitor C33 which rejects high frequency current signal with L12, and capacitors C27 C28 which matches transistors Q2 and Q3. The power amplifier 35 consists of transistor Q3 which amplifies the output of the driving amplifier 34 to final output level, it's biasing resistances R19 R20 R21, bypass capacitor C29, choke coil L13, capacitor C32 which rejects high frequency current signal, matching capacitors C30 C31 and resistance R22;

As shown in FIG. 8, the receiver 50, being a component of the RF module F in FIG. 3, FIG. 4*a*, FIG. 4*b* and FIG. 6 as stated above, consists of a LNA (Low Noise Amplifier) 51 which amplifies only desired signal excluding noise from output signal of the low pass filter 41 in the duplexer circuit 40, SAW (Surface Acoustic Wave) filter 52 which bandpasses the output signal of the previously stated LNA 51, local oscillator 53 which is composed of oscillator 53-1 generating signal of high frequency enough to make desired IF (Intermediate Frequency) signal and buffering amplifier 53-2 stabilizing above generated signal, mixer 54 which produces desired IF signal by mixing the outputs of SAW filter 52 and buffering amp 53-2, IF filter 55 which bandpasses only the IF signal from the mixer 54 output, IF amplifier 56 which amplifies IF signal filtered by IF filter 55, local oscillator 57 which generates fixed frequency signal to acquire desired frequency voice signal, mixer 58-1 which generates the desired voice signal by mixing the signal generated from the previously mentioned local oscillator 57 and the one amplified by the IF amp 56, voice signal filter 59 which passes only the desired frequency signal from output of the mixer 58-1, and demodulator 58-2 which generates output signal to the voice amp by demodulating the output of voice signal filter 59, wherein the mixer 58-1 and demodulator 58-2 is included in IF IC 58.

Figure 9:
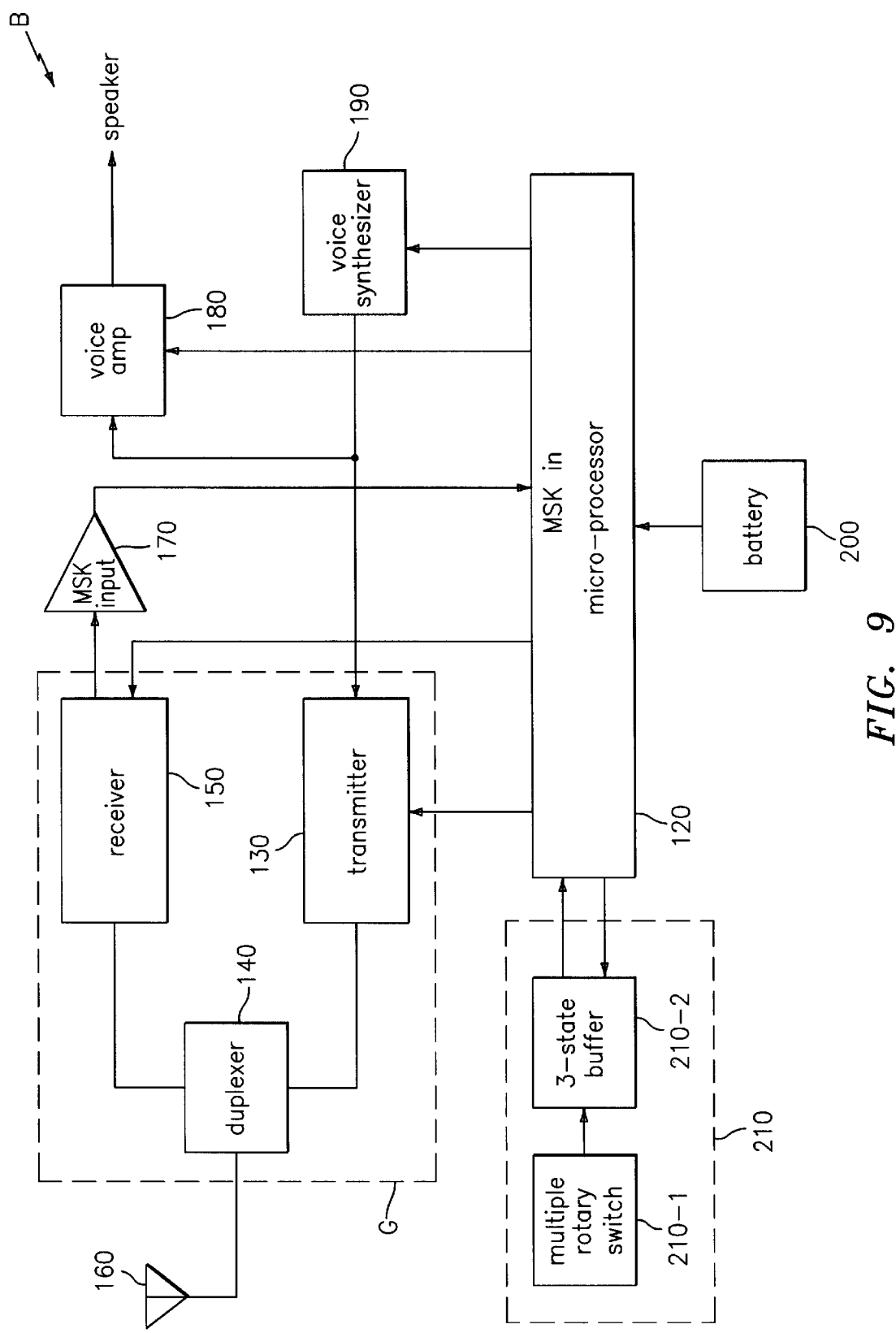
FIG. 9 is a block diagramic view of a base-set established at the building.
Figure 10:
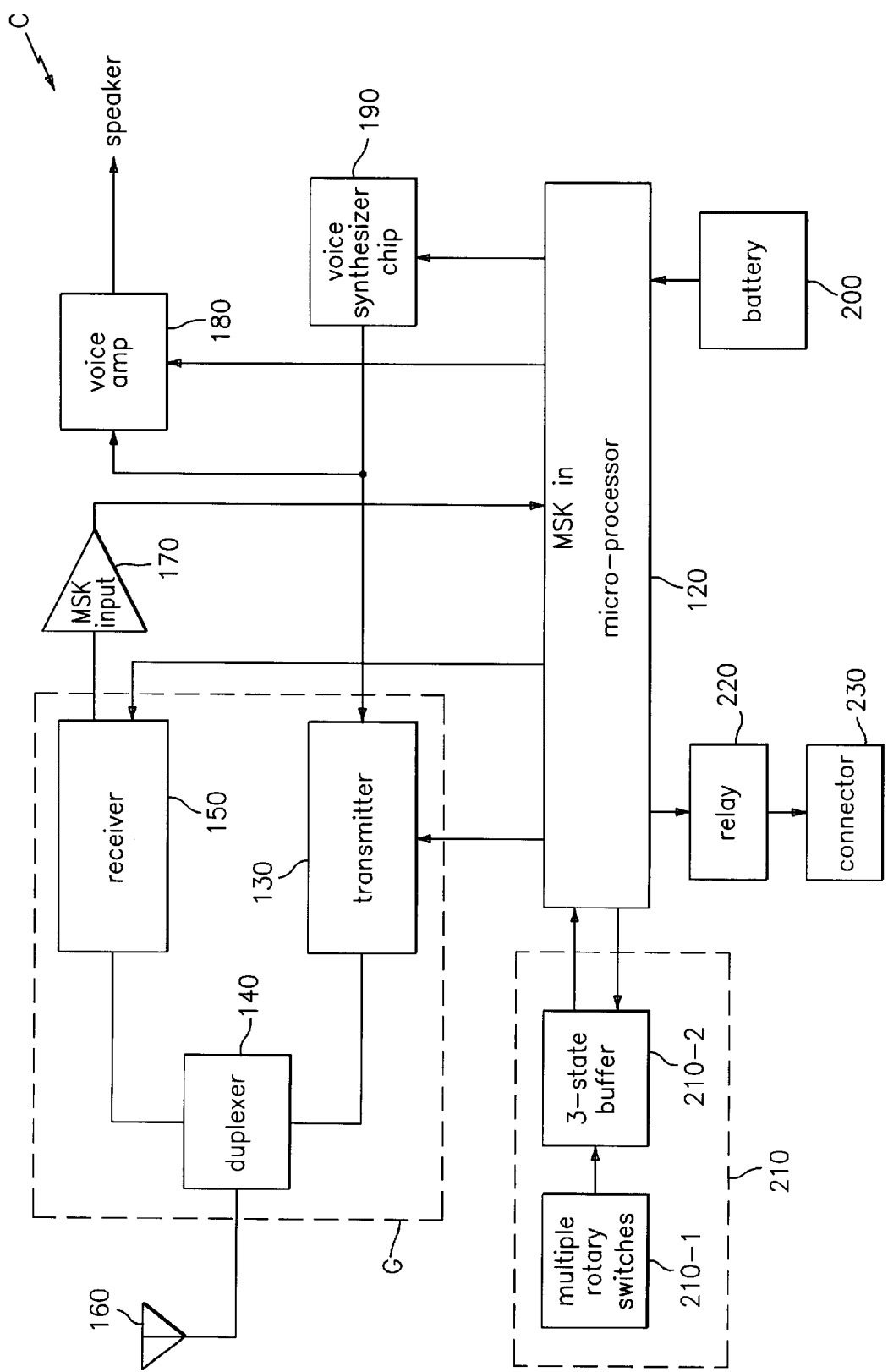
FIG. 10 is a block diagramic view of a base-set established at the road-crossing.

What follows is an illustration of the base-sets established at the destination with reference to FIG. 9, FIG. 10, FIG. 11 and FIG. 12.:

Referring to FIG. 9, it is shown that a base-set B established at a building is composed of micro-processor 120 which controls overall operation of the base-set, antenna 160 which transmits to and receives messages from the hand-held apparatus A, RF module G which will be briefly illustrated after, MSK input amp 170 which amplifies the MSK input signal generated from the previously stated receiver 150 of RF module G to ouput that signal into the micro-processor 120, voice synthesizer chip 190 which synthesizes the voice signal using the information produced by the micro-processor, to transfer the signal onto other apparatus or to output that signal through internal speaker according to demand received from the hand-held apparatus, voice amp 180 which amplifies the signal generated from the voice synthesizer chip and outputs that voice to speaker, battery 200, and ID setting switch 210 which has multiple rotary switches 210-1 and 3-state buffer 210-2 in order to set the building's own ID. And the RF module G comprises duplexer 140 which duplexes the transmission signal and the received signal so that the interference is avoided when using the same antenna for both of transmitting and receiving purposes, receiver 150 which processes the MSK signal received from the hand-held apparatus through the antenna 160 and duplexer 140 to output that signal onto the MSK input amp 170, and transmitter 130 which modulates the voice signal that have been synthesized by the voice synthesizer chip 190 under control of the micro-processor 120 on demand of the hand-held apparatus and transmits that modulated signal to the hand-held apparatus through the duplexer 140 and the antenna 160. As shown in FIG. 10, another example of base-set C, established at the road-crossing, includes all components of previously stated base-set B. Additionally, it has relay 220 and connector 230 in order to control an external signal lamp—not shown in FIG. 10—according to the demand of hand-held apparatus.

Figure 11:
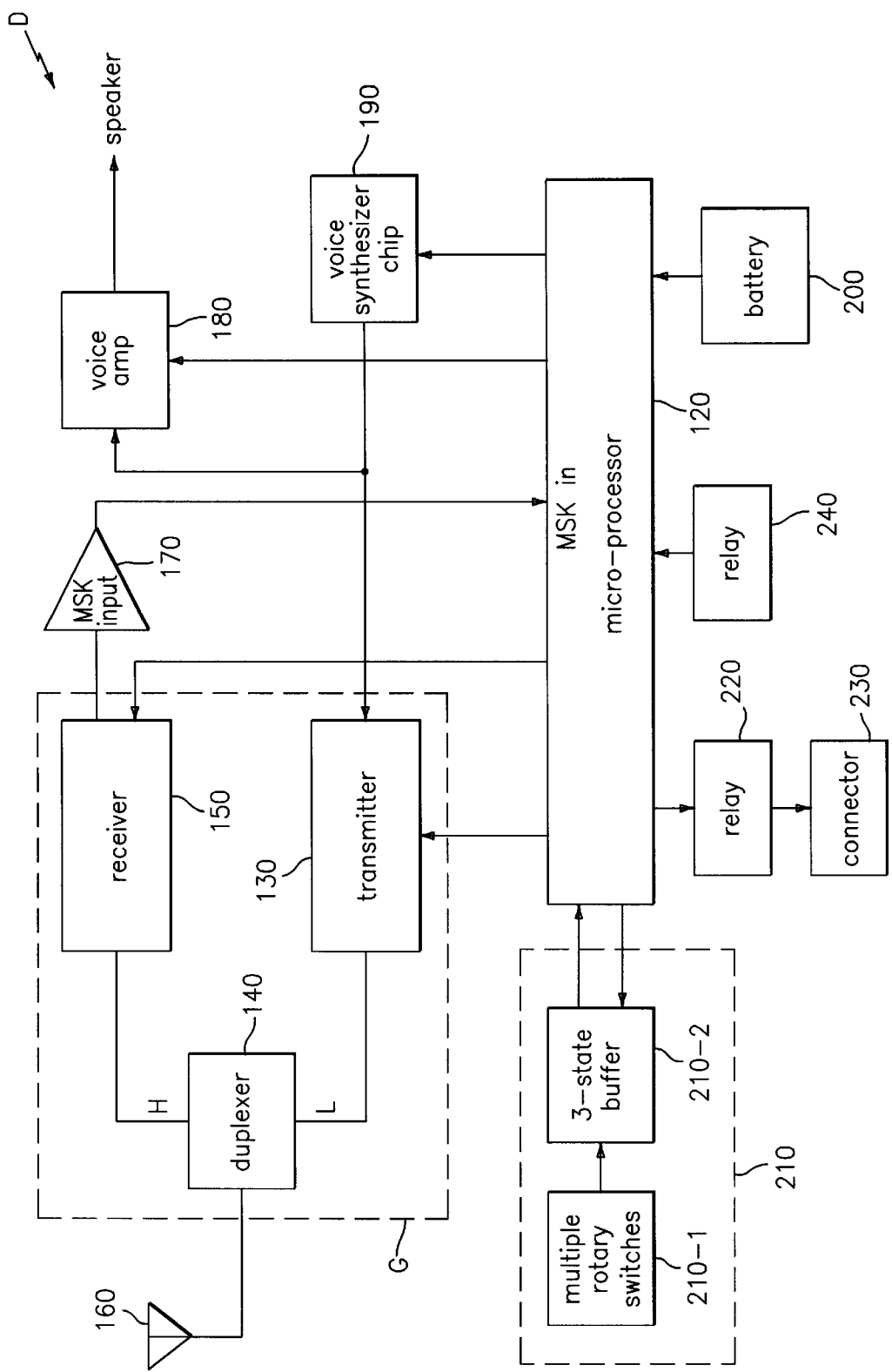
FIG. 11 is a block diagramic view of a base-set established at the bus.

As shown in FIG. 11, having all components of previously stated base-set C, the third example of base-set D, established at the bus, includes additional connector 240 which is used in interfacing with the bus driver. And the relay 220 and the connector 230 is used to control the external LED and buzzer—not shown in FIG. 11—which is for apprisng user that the hand-held apparatus or the base-set established at crossing E is calling.

Figure 12:
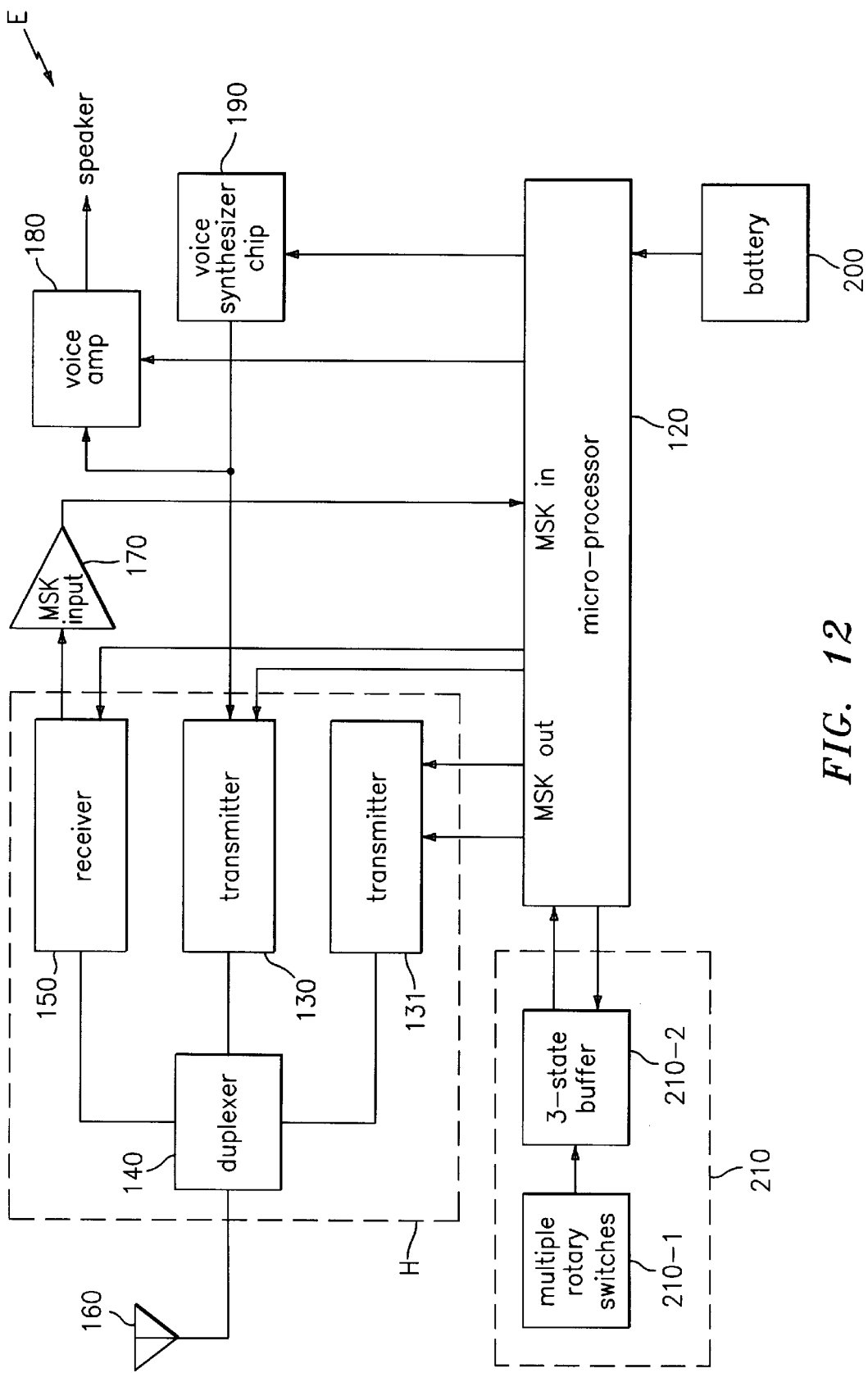
FIG. 12 is a block diagramic view of a base-set established at the bus stop.

As shown in FIG. 12, the fourth example of base-set E, established at the bus stop, has additional transmitter 131 at the RF module besides all components of the previously stated base-set B established at the building.

Not having to be so small, antennas of base-sets make use of efficient monopole antenna. Although the configuration is same, the receiver 150 at RF module G of base-sets differs only in the frequency generated by local oscillator from that of hand-held apparatus A because the demodulation frequency is different. Also in the base-sets, the low pass filter 41 located at the duplexer 140 is connected to the transmitter 130 of RF module G and the band-pass filter 41 is to the receiver 150.

The remainder of this discussion will now center around the details of the operation of the overall guidance system and the control method First of all, the hand-held apparatus A has such functions as follows:

To have base-sets react in response to the user's requests, preferred functions are one to transmit the sound requesting signal to base-sets in order to output the voice through the internal speaker of base-sets: which is useful when the user approaching a base-set wishes to know exact position of that base-set, one to request the base-set established at crossing to set the switch: which is useful when the user is to cross the road crossing, one to call buses : useful when a user, a visually handicapped person, wants to apprise that he is waiting for the bus because there is no bus stop, one to request base-set E established at bus stop to register bus ID: useful when a user wants to make the base-set E established at bus stop undertake function of calling buses, one to request base-sets to respond through internal earphones of hand-held apparatus A when corresponding call is transmitted: useful when a user wants to know the desired base-set accessible, one to request all accessible base-sets to respond through internal earphones when a call is transmitted: useful when a user wants to know all base-sets accessible, and one to request to do the most recent function: which is useful when there is no response received from base-set or a user wants to order that previous function again. Additional functions included are a function to clear the previous input when a wrong input was made, one to buzz through the buzzer 100 and to light LED when a hand-held apparatus is lost or has fallen down to the ground making intolerably strong impulse than tolerable one to the apparatus, so that a user can find the position of apparatus and can find ways to ask for help, one to alarm user that the time to replace battery 80 has come by sensing the exhaustion of battery 80 through the low voltage sensor 90.

Base-sets have such functions as follows:

The basic functions which building base-set B, bus stop base-set E and road crossing base-set C have are one to respond in vocal signal in response to the corresponding requesting signals of hand-held apparatus A and one to make sound through internal speakers in order to apprise the position of base-sets. Besides, the bus stop base-set E has additional functions to register the ID of buses requested by the hand-held apparatus A and to transfer corresponding calling signals to registered buses periodically for a given period of time. The road crossing base-set C has additional function to adjust the switch of traffic light in response to the switch adjustment request of hand-held apparatus A.

Particularly, the bus stop base-set D has a function of lighting the lamp or of buzzing through the buzzer, when a corresponding calling signal is received, notifying bus driver that a handicapped person is waitng for the bus which function would be preferred to that of sending vocal signal by wireless and a function of making sound come through internal speaker in response to driver apprising that bus will stop.

The communication between the hand-held apparatus A and base-sets will be well illustrated by taking an examplary situation that a user requests voice output through the internal speaker of hand-held apparatus to know the position of building base-set B, in other words, by examining the transmission of corresponding calling signal and the voice response signal.

If a user requests micro-processor the transmission of corresponding calling signal by keying the calling signal sending function key attatched at hand-held apparatus after selecting the wished building base-set's ID, then the micro-processor, recognizing this request, sets data that will be transmitted, turns on the transitter 30, sets the PLL data by which the transmission frequency is determined, outputs that MSK signal to transmitter, and turns off the transmitter 30, which is the completion of the requested demand. And, the micro-processor turns on the receiver 50 and voice amp 70 waiting for the response of wish wished base-set. After a predefined time, the micro-processor turns off the receiver 50 and voice amp 70, senses whether the voltage is below the tolerable level or not, and then goes back to the sleep mode.

A detailed illustration of the above operation is as follows:

The micro-processor 20 turns on the receiver 30, which was turned off to save the power, enabling the transmission of data, sets the PLL IC 33 of transmitter 30 with PLL data by which the transmission frequency will be determined and converts the data to transmit into MSK signal, to output that signal onto attenuater 31-1 of VCO 31.

When the MSK signal is attenuated to a proper level to be supplied onto the resonance circuit 31-2, the resonance circuit 31-2 becomes resonant with a frequency determined by the varactor VC2 whose reactance variates according to the output DC voltage of PLL IC 33, capacitors C14 C15, and coil L9. And, oscillator 31-3 oscillates that resonance signal outputting that oscillated signal onto the PLL IC 33, then the PLL IC 33 compares the phase of signal produced from the VCO to that of reference signal using the information provided by the micro-processor 20 to output that signal onto the loop-filter 32. Finally, loop-filter 32 outputs the signal onto the VCO 31 rejecting the high frequency signal developed when the output of PLL IC 33 variates. The previously mentioned PLL IC 33, loop-filter 32, and VCO 31 make a loop to have constant frequency by controlling the ouput voltage of VCO 31 with that of PLL IC 33. The output of the above mentioned VCO 31, being amplified primarily at driving amp 34, is amplified at power amp 35 to a desired level high enough to be transmitted through antenna 60 passing the band-pass filter 42 of duplexer 40.

At base-set B, The antenna 160 receives above calling signal transmitted from hand-held apparatus A. This received signal is processed by band-pass filter of duplexer 140, amplified at MSK input amp 170 and the micro-processor 120 generates MSK receive interrupt. The micro-processor 120 makes voice signal by outputting the corresponding response data onto the voice-synthesizer chip 190, turns on the transmitter 130 making transmission possible, then, outputs that voice signal onto transmitter 130, which is the completion of the base-set's response to the request of hand-held apparatus A.

At hand-held apparatus A, the voice signal, which was transmitted by wireless through the previously mentioned base-set's operation, is processed at receiver 50 by antenna 60 and band-pass filter 41 of duplexer 40, to be output through ear phones finally. In this way, the user, a visually handicapped person, is able to know whether the base-set B is in the boundary of A's access or not.

Figure 13A:
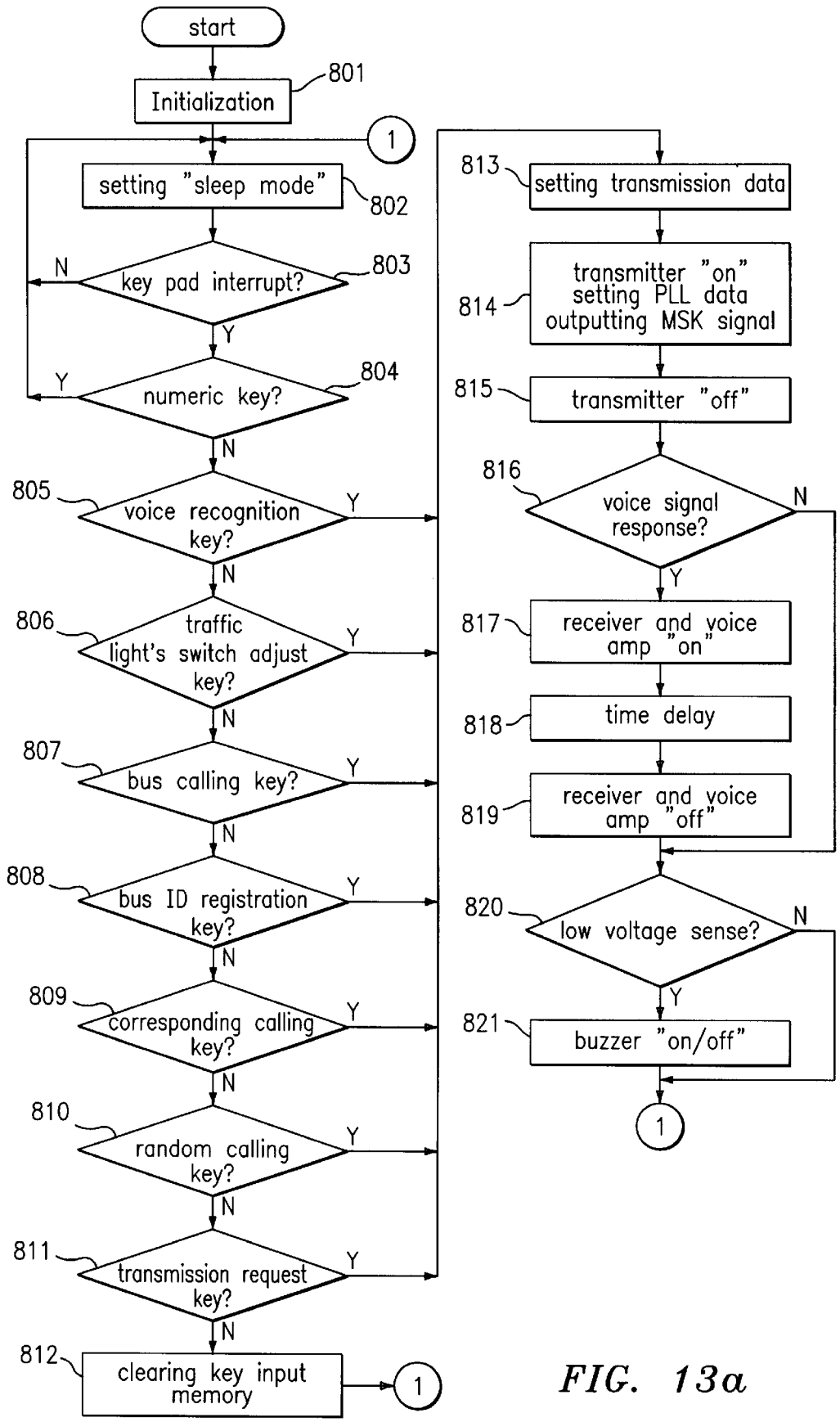
FIGS. 13a, 13b and 13c are flow charts of control method for hand-held apparatus A.
Figure 13B:
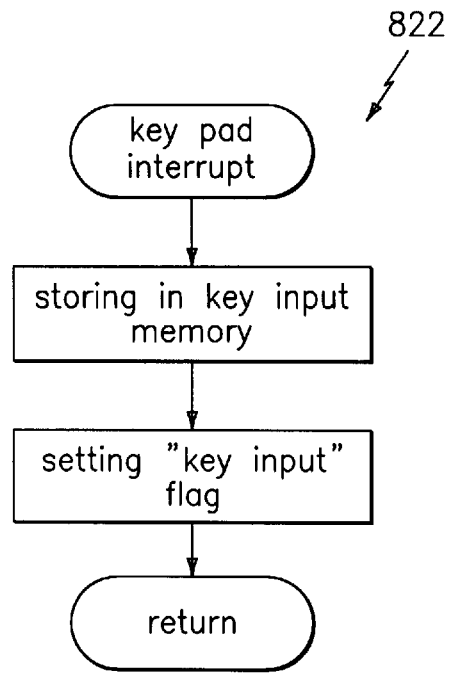
Figure 13C:
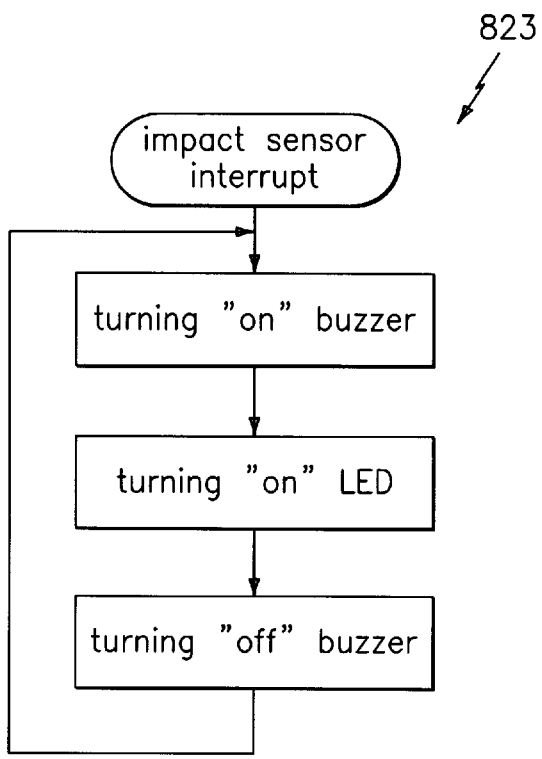

The control flow of each systems and apparatuses in conducting above examplary operation can be explained as follows with reference to FIGS. 13a, 13b, 13c, 14a and 14b:

Referring to FIGS. 13a, 13b and 13c, the control flow of hand-held apparatus A having the constitution as shown in FIG. 2 and FIG. 3 is to be explained by mentioning one examplary operation.

Firstly, control steps of hand-held apparatus A of FIG. 2 in doing one examplary operation contains such steps as: a step 802 to set the mode of micro-processor 20 to a sleep mode after initialization 801, a step 803 to check the input interrupt of key-pad, a step 804 to determine whether the input key is numeric key or not, steps to perform the corresponding function requested by a user deciding what the input keys are, a step to determine whether the key input is the key of function to wait for the response of base-sets after conduction of the above user's requested function, a step to receive the response of base-sets after transmission of the requesting signal of hand-held apparatus A, and a step to service the key pad interrupt.

Besides, the hand-held apparatus A of FIG. 3 contains all previously mentioned steps and additional steps such as: a step of making interrupt in response to the impact-sensor 110 for the convenience of user and a step 820 to determine whether the replace time is come or not by sensing the voltage of battery through the low voltage sensor 90.

Referring to FIGS. 12, 13a, 13b and 13c, a more detailed illustration of the control flow of above steps can be described as follows:

The micro-processor 20, when supplied with power, initializes required registers or RAMs as 801, sets the mode to a sleep mode in order to prevent the power consumption as 802. In sleep mode, If a user presses any keys in hand-held apparatus A's key pad 10 to acquire the desired information, then micro-processor 20 makes keypad interrupt as 822, stores the input data at memory, and returns that data after setting the key pad interrupt flag.

With the occurance of above key pad interrupt, the micro-processor 20 is converted to active mode from sleep mode. Subsequently, the micro-processor 20 detects the occurance of interrupt flag in order to determine what kind of interrupt has generated. According to the type of interrupt generated the following operation is performed. In other words, if a numeric key interrupt has generated as 804, then micro-processor 20 goes back to the sleep mode to wait for the next key input, otherwise, or a function key interrupt has generated, determines what kind of function key interrupt has generated by checking whether the key was voice recognition key as 805 or traffic light's switch adjust key as 806 or bus calling request key as 807 or bus ID registration request key as 808 or the corresponding call request key as 809 or random call request key as 810 or transmission request key as 811 consequently. After this detection process, if the pressed key was not correspond to any type of predefined interrupt, then it is concluded that a clear key has pressed and the micro-processor goes back to sleep mode after clearing the memory as 812.

Because any function keys except clear key requests base-sets to transmit signal, the corresponding data is to be set after the detection process as 813, wherein the data is composed of frame which is for error correction, destination base-set's ID, and a packet containing required messages.

In order to transfer the data, microprocessor 20 enables transmission by turning on the transmitter of RF module F, sets the PLL data which is for the purpose of providing information about transmission frequency to PLL IC 33, and turns off the transmitter 30 after outputting the MSK signal as 814 and 815. Then, the microprocessor determines whether wireless voice signal response is necessary as 816. If it is not, system switches over to low voltage sensing step 820. If it is so, or wireless voice signal response is necessary, then the micro-processor enables receiving through earphone by turning on the receiver 50 and voice amp 70 as 817, waits for the response from base-sets delaying for a certain period of time sufficient for base-sets, which is in distance of access, to respond as 818. After the above process, the receiver 50 and voice amp 70 are turned off to disable the receiving process as 819. At the low voltage sensing step 820, the voltage level of battery is detected as 820. When the low level is detected, the micro-processor buzzes the buzzor to notify the user that the replace time is come as 821 and goes back to the sleep mode 802, If not, goes back to sleep mode doing nothing.

When the impact sensor 110 interrupt—the impact sensor interrupt has higher priority than key pad interrupt has—is occured during above steps as 823, LED and buzzor 100 are turned on to inform a user that the hand-held apparatus has fallen down to ground making impact onto it, and the micro-processor 20 stands by until the apparatus A is resetted.

Figure 14A:
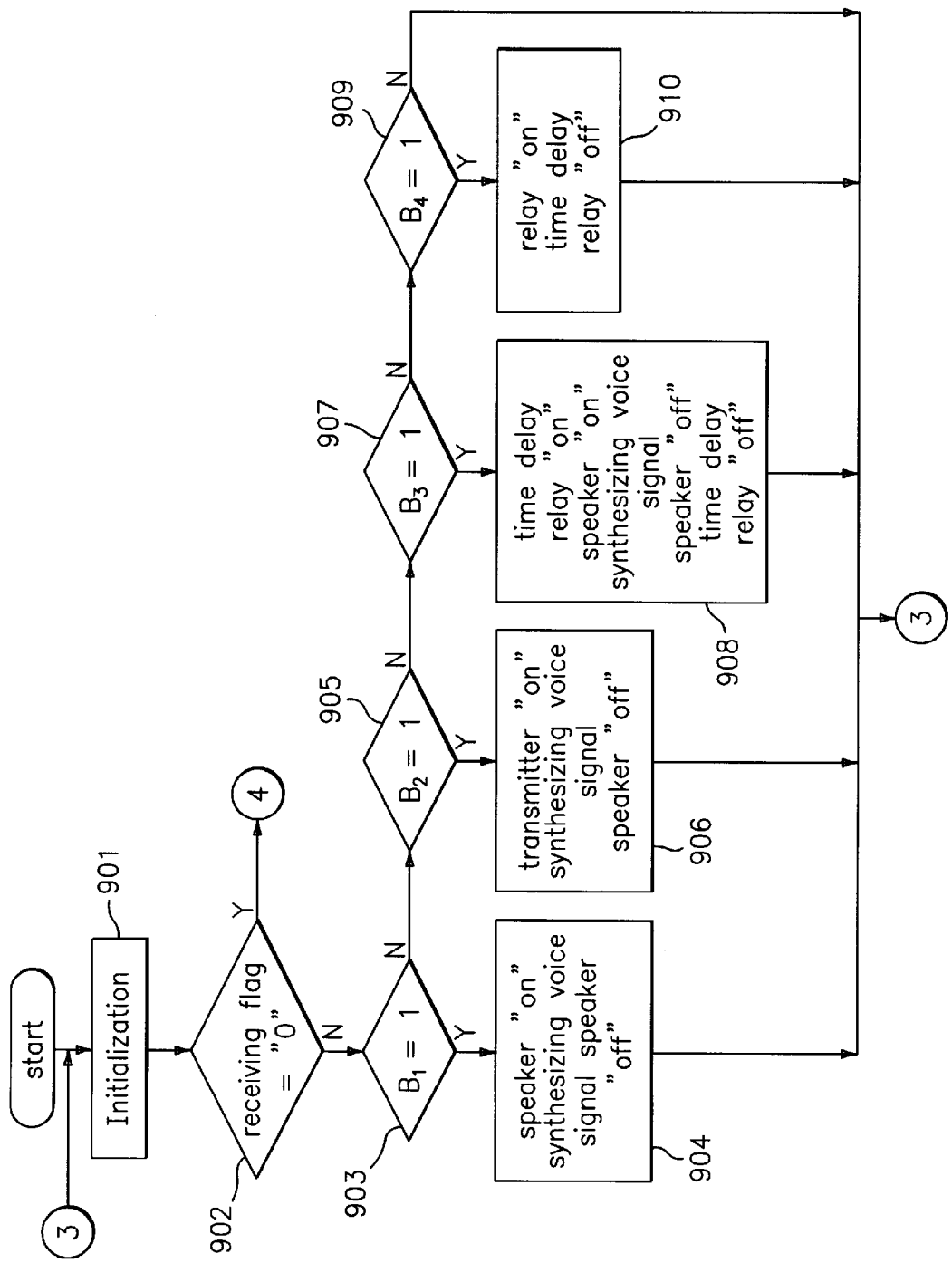
FIGS. 14a, 14b, 14c and 14d are flow charts of control method for base set.

An examplary control flow of base sets will be illustrated with reference to FIGS. 14a and 14b. The control flow of base-sets consists of normal control step and MSK receive interrupt service step. And one micro-processor 120 controls all base-sets of building base-set B, road-crossing base-set C, bus base-set D, and bus-stop base-set E.

Firstly, the normal control step consists a step 901 to initialize, steps to perform the requested function corresponding to the flag which was set when MSK receive-interrupt occured, a step to perform the bus calling request of bus stop base-set E, a step to perform the request of bus base-set D, and a step to service MSK receive-interrupt.

The control flow of above steps will be illustrated as follows:

When supplied with power, the micro-processor 120 initializes the required register or RAM, and interrupt flags, and ports. After this initialization step 901, it detects receive-flag to determine whether the signal transmitted from hand-held apparatus A has received as 902. If the receive-flag has set from the occurrence of MSK receive-interrupt, then the corresponding steps requested is performed at steps from 903 to 910, the micro-processor 20 goes back to receive-flag detection step 902. Otherwise, if the receive-flag was set to 0, the timer interrupt is detected for execution of periodical calling functions requested by bus as 911. According to the above detection, if the timer interrupt has occured, the calling functions requested by bus are performed as shown from 912 to 920, the micro-processor is switched over to the step to determine what the request of bus driver is as 921. On the other hand, if the timer interrupt was not occured, it comes just the step to determine what the request of bus driver is as 921

If there is any request from bus driver, it goes to the step to detect the receive-flag after execution of voice output through speaker requested by bus driver as 922. If not, it just goes to the step to detect the receive-flag doing nothing further.

The above mentioned steps forms a loop.

Each steps will be illustrated at more detailed manner as follows:

At initialization step 901, the micro-processor clears RAM, turns off the relay, transmitter of RF module, speaker, rotary switch, and switch-enable. Then, it reads ID and output that onto speaker, initializes the MSK receiver by turning on the receiver of RF module, and enables the master interrupt.

At a step to execute requested function corresponding to each flag bits which were set from the occurance of above MSK receive-interrupt, a step from 903 to 910, it is determined which bit was set among the bits of receive-flags. If bit 1 was set, the speaker is turned on to output generated voice signal and is turned off thereafter as 904. If bit 2 was set, the transmitter 130 is turned on enabling transmission, to transmit the generated voice signal and is turned off thereafter as 906. If bit 3 was set, the blue traffic light is turned on by turning on the relay after a cetrain period of time delay, the speaker is turned on to output generated voice signal through, and the relay is turned off after a certain period of time delay as 908. If bit 4 was set, the external lamp or buzzor is turned on or off in order to inform bus driver that a visually handicapped person is waiting for the bus as 910.

Steps, steps from 911 to 920, to execute bus calling function requested by bus stop base-set E contains a few steps such as: a step 911 to determine the timer interrupt, a step 912 to set 'bus ID storage memory pointer' (called BIDPNT) when the interrupt is occured, a step 913 where the bus calling transmission data is set, the transmitter of RF module is turned on, PLL data is set, MSK signal is output, and the transmitter is turned off thereafter in order to transmit the bus calling signal making use of above BIDPNT, steps 914 and 915 to determine whether the repeated calling operation of corresponding bus for a certain time is over by decreasing transmission counter by 1 and detecting whether the counter is "0", a step 916 of clearing the corresponding bus ID and decreasing the counter by 1 when the transmission was "0" in consequence of previous detection, a step 917 to determine whether all bus-calling requests registered at bus ID storage memory has transmitted by detecting if the BIDPNT is pointing at end, a step 918 to increase BIDPNT by 1 if the BIDPNT is not pointing at end, a step 919, when BIDPNT is pointing at end, to determine whether the bus ID storage memory is empty by detecting if the bus ID storage counter has the maximum value, and a step 920 to prevent occurance of any interrupt by stopping the timer interrupt when the bus ID storage memory is completely empty During the step to perform the bus driver's request of bus base-set D, it is determined whether there has been voice ouput-request through driver's speaker as 921. And if there has been, speaker is turned on to output generated voice signal and is turned off thereafter as 922.

Figure 14B:
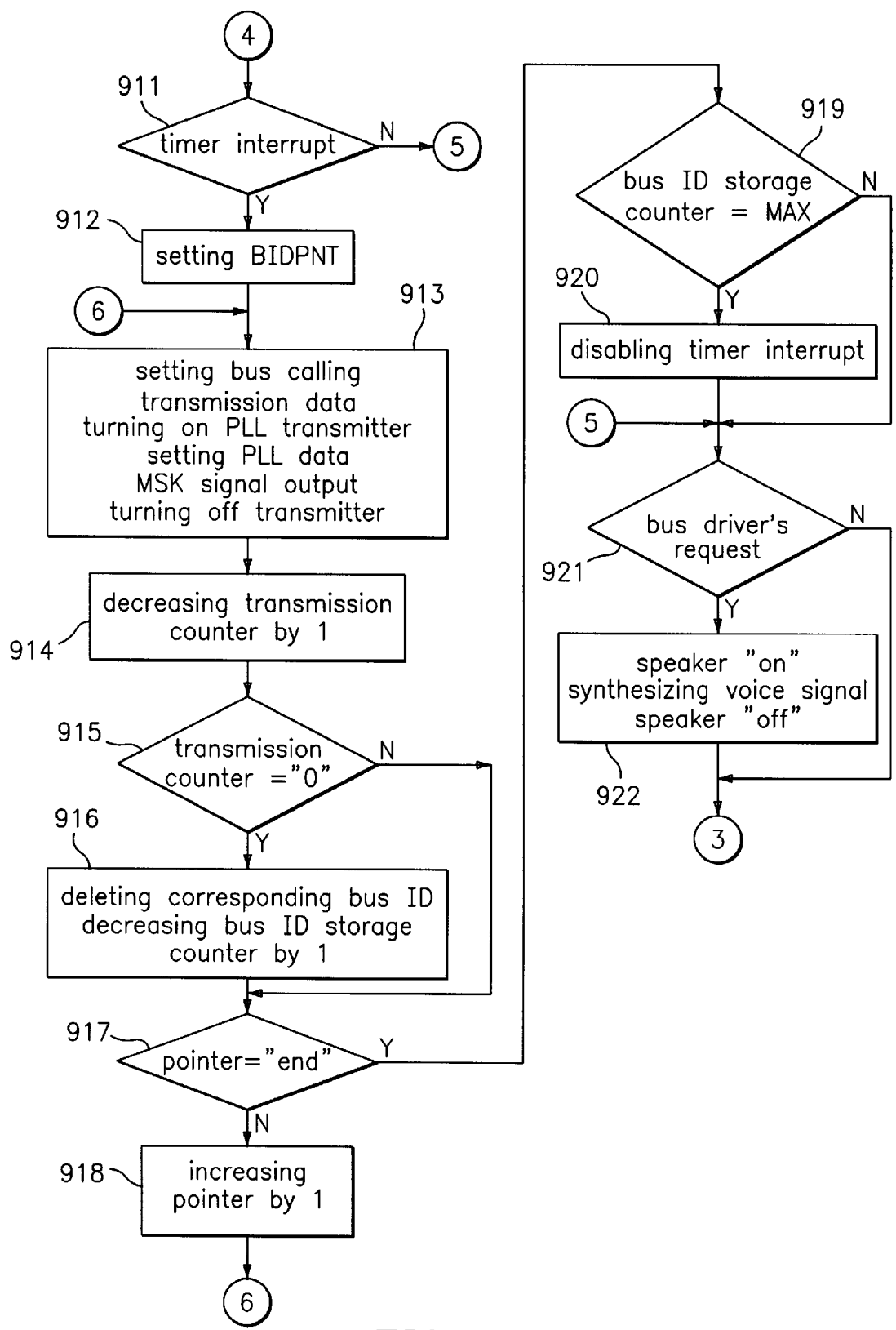
Figure 14C:
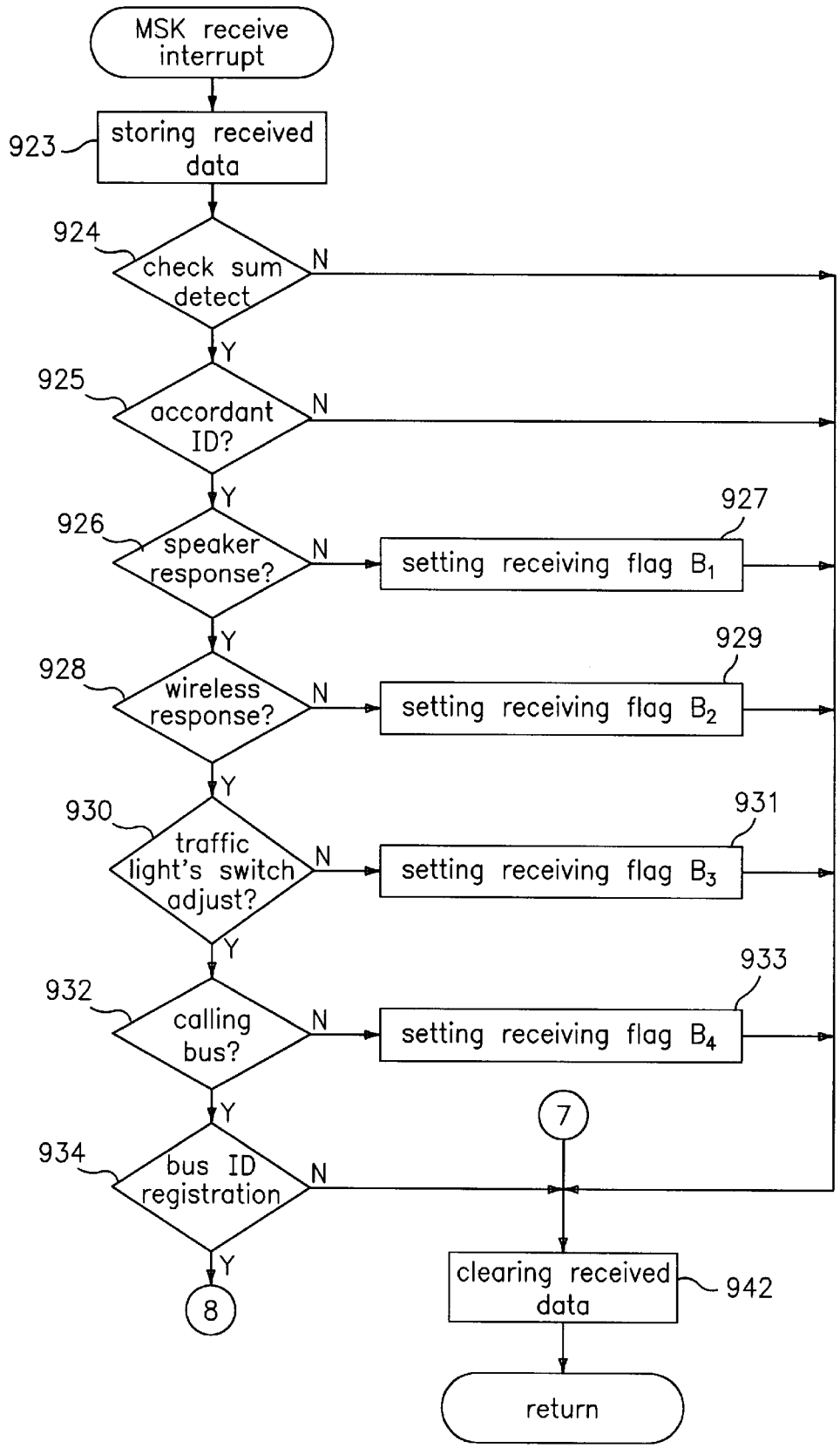
Figure 14D:
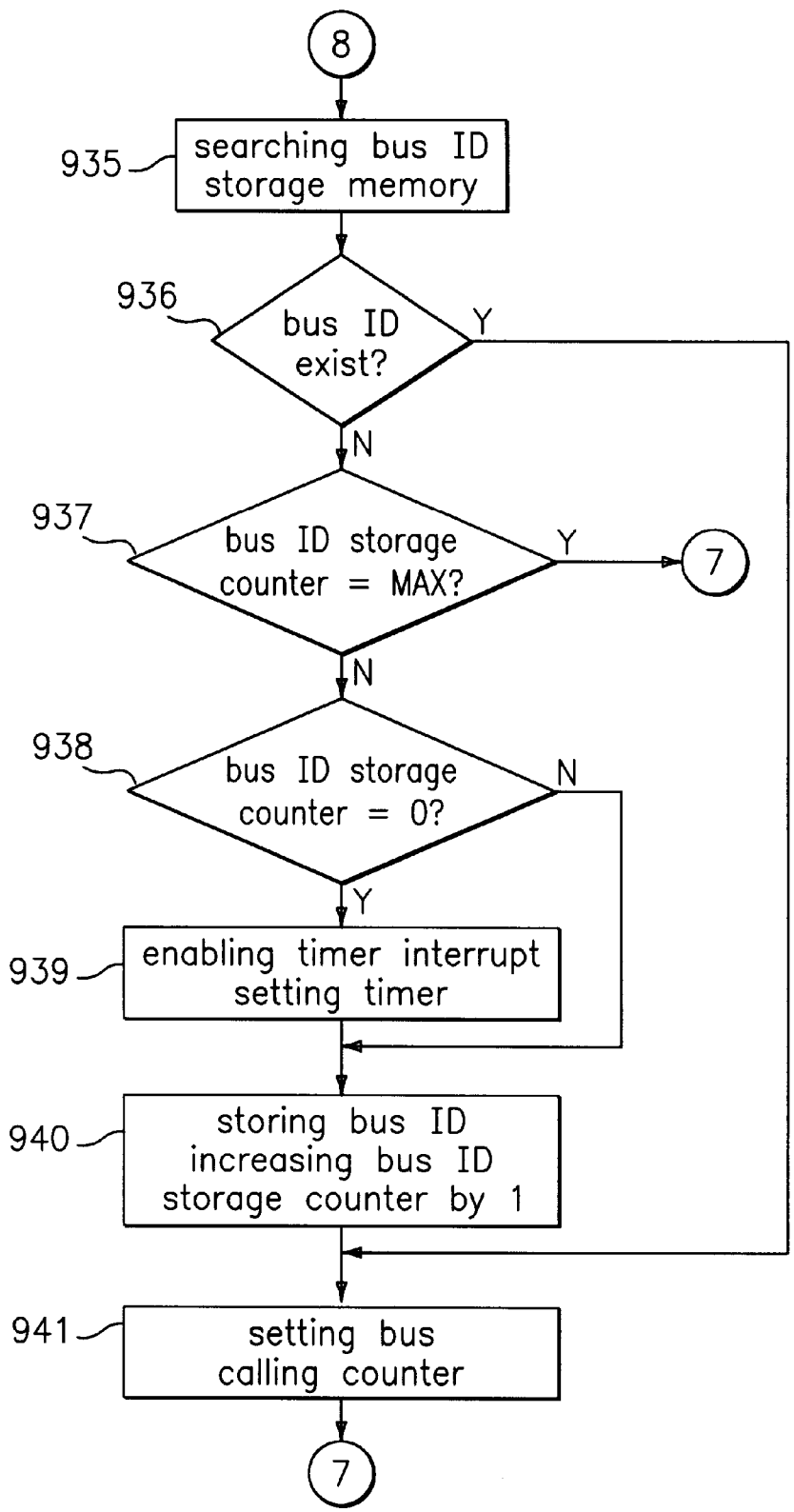

As shown in FIG. 14b, The step to service MSK receiving interrupt at base-sets consists such steps as: a step 923 of storing the received data, a step 924 of checksum detection, a step 925 to verify if IDs are accordant, steps 926 to 933 of setting receiving-flag in order to perform the conrredponding packet's response verifying the packet, steps 935 to 941 of preparation for execution of bus ID registration request wherein the bus was requested by hand-held apparatus A, and a step 942 to clear the received data before the termination of interrupt operation for the next receive of data. More detailed illustration of previously mentioned control flow 923 to 942 is going to follow:

When a receiving interrupt is occurred, the received data is stored and the check-sum is confirmed. According to the result of confirmation process 924, if there is some errors, the received data is cleared to terminate interrupt operation. If there is not, the ID is confirmed whether it is coincident or not as 925, and the received data is cleared to terminate interrupt operation when not coincident, is set in order to execute the corresponding packet's response after verification of packet when coincident. According to the verification of received packet, if it is of speaker response then receiving flag's bit 1, if wireless response then bit 2, if adjustment of traffic light's switch then bit 3, and if bus calling then bit 4 is set. If the packet is of request of bus ID registration requested by hand-held apparatus A then the step of preparation for execution of that request is carried upon, otherwise the received data is cleared and returned to terminate the MSK receive-interrupt.

The step of preparation to execute the bus ID registration request wherein the bus was requested by hand-held apparatus A to bus-stop base-set E among above mentioned steps will be explained in more detailed manner:

The bus ID storage memory is searched to determin whether the bus ID requested by a user, who is visually handicapped, is aleady in that as 935. According to the result of this search, if there stored aleady then the bus calling counter is set as 941, and if not, whether the bus ID storage memory is full or not is determined by comparing the number of bus ID's counter with that of maximum as 937. Subsequently after this determination, if the storage memory is full, then the received data is cleared to terminate the interrupt operation not doing registration of received bus ID. If it is not, whether the bus ID storage memory is completly empty or not is determined by comparing the bus ID storage counter's number with "0" as 938. After this, if the bus ID storage memory is empty, timer interrupt is enabled, the timer is set as 939, the bus ID is stored, and the bus ID storage counter is increased by 1 as 940. If the bus ID storage memory is not empty, the bus ID gets stored right away, the bus ID storage counter is increased by 1 as 940, and the micro-processor sets bus calling counter again to repeat bus calling periodically for a certain time.

It will be understood that various other changes in details, materials, steps and arrangement of parts, which have been herein described and illustrated in order to explain the nature of the invention, may be made by those skilled in the are within the principle and scope of the invention as expressed in the appended claims.

What is claimed is:

1. An interactive RF guidance system comprising:

a) a plurality of stationary base-sets established at a road crossing to perform functions requested by hand-held apparatus; and b) a plurality of hand-held apparatuses capable of being carried along by visually handicapped people to transmit messages to said base-sets and receive responses from them;

(a) said base-set comprising:

a microprocessor which controls overall operation of the base-set;

an antenna which transmits to and receives messages from the hand-held apparatus;

an RF module which comprises a duplexer that duplexes the transmission signal and the received signal so that interference is avoided when using the same antenna for both transmitting and receiving and a receiver that processes an MSK (Minimum Shift Keying) signal received from the hand-held apparatus through the antenna and duplexer to output that signal onto an MSK input amplifier, and a transmitter that modulates a voice signal that has been synthesized by a voice synthesizer chip under control of the microprocessor on demand of the hand-held apparatus and transmits that modulated signal to the hand-held apparatus through the duplexer and the antenna;

said MSK input amplifier which amplifies the MSK input signal generated from the RF module receiver to output that signal into the microprocessor;

said voice synthesizer chip which synthesizes a voice signal using the information produced by the microprocessor, to transfer the signal onto other base-sets or to output that signal through an internal speaker according to demand received from the hand-held apparatus;

a voice amplifier which amplifies the signal generated from the voice synthesizer chip and outputs that voice to a speaker;

a battery;

an ID setting switch which has multiple rotary switches and a 3-state buffer in order to set a building's own ID; and a relay and connector which control an external signal lamp according to the demand of the hand-held apparatus; and (b) wherein said hand-held apparatus comprises;

a keypad, by which a user requests the microprocessor to execute functions and having multiple numeric keys and function keys to request execution of wished functions;

a microprocessor, which executes functions requested by the keypad and controls overall operation of said apparatus;

an antenna, which transmits and receives signals;

an RF module, which processes and outputs signals to transmit through the antenna, and processes and outputs a voice signal received through a voice amplifier;

said voice amplifier, which amplifies the received voice signal, to output that signal onto an earphone under control of the microprocessor;

a battery, which supplies power to the apparatus;

a low voltage sensor, which senses low level voltage produced when voltage supplied by the battery drops under a proper level and outputs that data onto the microprocessor;

an impact sensor which senses the shock generated when the apparatus falls down to the ground and outputs that data to the microprocessor; and a buzzer and an LED (Light Emission Diode), which notify replacement time of the battery or apprise the user that the apparatus has fallen down to the ground in addition to mentioned compositions.

2. The system as claimed in claim 1, wherein said antenna is a loop antenna for full duplex having two different resonance frequencies.

3. The system as claimed in claim 1 wherein said RF module of the hand-held apparatus, comprises:

(a) said transmitter, which performs necessary processing in order to transmit the MSK (Minimum Shift Keying) signal produced by the microprocessor;

(b) said duplexer, which duplexes the transmission signal and the received signal so that the interference can be avoided when using the same antenna for both transmission and reception purposes; and (c) said receiver which processes the received signal from the base-sets to make sound come through voice amplifier, said voice amplifier amplifies the low level signal produced by the receiver; and said duplexer comprises a low pass filter and band pass filter in order to reject a high frequency signal, and said low pass filter is connected to the receiver of the RF module and the band pass filter to the transmitter.

4. The system as claimed in claim 3, wherein said transmitter comprises:

(a) A PLL (Phase Locked Loop) IC which compares the phase of signal produced from a VCO to that of a reference signal using information provided by the microprocessor to output that signal onto a loop filter;

(b) said loop filter which outputs the signal onto the VCO rejecting the high frequency signal produced when the output of the PLL IC varies abruptly;

(c) said VCO whose frequency is controlled by the output signal frequency of the PLL IC;

(d) a driving amplifier which amplifies the signal to a specific level; and (e) a power amplifier which amplifies that output signal of driving amplifier to a desired level high enough to be transmitted.

5. The system as claimed in claim 3, wherein said receiver comprises:

(a) an LNA (Low Noise Amplifier) which amplifies only desired signals excluding noise from output signals of the low pass filter in the duplexer circuit;

(b) a SAW (Surface Acoustic Wave) filter which bandpasses the output signal of the LNA;

(c) a local oscillator which is composed of oscillator generating signals of high frequency sufficient to generate desired IF (Intermediate Frequency) signals and a buffering amplifier stabilizing the generated signals;

(d) a first mixer which produces desired IF signals by mixing outputs of the SAW filter and buffering amplifier;

(e) an IF filter which band-passes only the IF signal from the mixer output;

(f) an IF amplifier which amplifies the IF signal filtered by the IF filter;

(g) a local oscillator which generates fixed frequency signals to acquire desired frequency voice signals;

(h) a second mixer, being a component of an IF IC which generates the desired voice signal by mixing the signal generated from the local oscillator and the signal amplified by the IF amplifier;

(i) a voice signal filter which passes only the desired frequency signal from output of the second mixer; and (j) a demodulator, being a component of the IF IC, which generates an output signal to the voice amplifier by demodulating the output of the voice signal filter.

6. An interactive RF guidance system comprising:

a) a plurality of stationary base-sets established at a bus to perform functions requested by hand-held apparatus; and b) a plurality of hand-held apparatuses capable of being carried along by visually handicapped people to transmit messages to said base-sets and receive responses from them;

(a) said base-set comprising:
a microprocessor which controls overall operation of the base-set;
an antenna which transmits to and receives messages from the hand-held apparatus;
an RF module which comprises a duplexer that duplexes the transmission signal and the received signal so that interference is avoided when using the same antenna for both transmitting and receiving and a receiver that processes an MSK (Minimum Shift Keying) signal received from the hand-held apparatus through the antenna and duplexer to output that signal onto the MSK input amp, and a transmitter that modulates the voice signal that has been synthesized by the voice synthesizer chip under control of the microprocessor on demand of the hand-held apparatus and transmits that modulated signal to the hand-held apparatus through the duplexer and the antenna;
said MSK input amplifier which amplifies the MSK input signal generated from the RF module receiver to output that signal into the microprocessor;
said voice synthesizer chip which synthesizes a voice signal using information produced by the microprocessor, to transfer the signal onto other base-sets or to output that signal through an internal speaker according to demand received from the hand-held apparatus;
a voice amplifier which amplifies the signal generated from the voice synthesizer chip and outputs that voice to a speaker;
a battery;
an ID setting switch which has multiple rotary switches and a 3-state buffer in order to set a building's own ID; and
a connector which is used in interfacing with a bus driver for providing a bus stop sound generating signal to the microprocessor in response to a request from the hand-held apparatus; and (b) wherein said hand-held apparatus comprises;
a keypad, by which a user requests a microprocessor to execute functions and having multiple numeric keys and function keys to request execution of wished functions;
the microprocessor, which executes functions requested by the keypad and controls overall operation of said apparatus;
an antenna, which transmits and receives signals;
an RF module, which processes and outputs signals to transmit through the antenna, and processes and outputs voice signals received through a voice amplifier;
said voice amplifier, which amplifies the received voice signal to output that signal onto an earphone under control of the microprocessor;
a battery, which supplies power to the apparatus;
a low voltage sensor, which senses low level voltage produced when voltage supplied by the battery drops under a proper level and outputs that data onto the microprocessor;
an impact sensor which senses the shock generated when the apparatus falls down to the ground and outputs that data to the microprocessor; and
a buzzer and a LED (Light Emission Diode), which notify replacement time of the battery or apprise the user that the apparatus has fallen down to the ground in addition to mentioned compositions.

7. The system as claimed in claim 6, wherein said antenna is a loop antenna for full duplex having two different resonance frequencies.

8. The system as claimed in claim 6, wherein said RF module of the hand-held apparatus comprises:

(a) said transmitter, which performs necessary processing in order to transmit the MSK (Minimum Shift Keying) signal produced by the microprocessor;

(b) said duplexer, which duplexes the transmission signal and the received signal so that the interference can be avoided when using the same antenna for both transmission and reception purposes; and (c) said receiver which processes the received signal from the base-sets to make sound come through voice amplifier;
said voice amplifier amplifies the low level signal produced by the receiver; and
said duplexer comprising a low pass filter and band pass filter in order to reject a high frequency signal, and said low pass filter is connected to the receiver of an RF module and the band pass filter to the transmitter.

9. The system as claimed in claim 8, wherein said transmitter comprises:

(a) a PLL (Phase Locked Loop) IC which compares the phase of signal produced from a VCO to that of a reference signal using the information provided by the microprocessor to output that signal onto a loop filter;

(b) said loop filter which outputs the signal onto the VCO rejecting the high frequency signal produced when the output of the PLL IC varies abruptly;

(c) said VCO whose frequency is controlled by the output signal frequency of the PLL IC;

(d) a driving amplifier which amplifies the signal to a specific level; and (e) a power amplifier which amplifies that output signal of the driving amplifier to a desired level high enough to be transmitted.

10. The system as claimed in claim 8, wherein said receiver comprises:

(a) an LNA (Low Noise Amplifier) which amplifies only desired signals excluding noise from output signals of the low pass filter in the duplexer circuit;

(b) A SAW (Surface Acoustic Wave) filter which bandpasses the output signal of the LNA;

(c) a local oscillator which is composed of oscillator generating signals of high frequency sufficient to generate desired IF (Intermediate Frequency) signals and buffering amplifier stabilizing the generated signals;

(d) a first mixer which produces a desired IF signal by mixing outputs of the SAW filter and buffering amplifier;

(e) an IF filter which band-passes only the IF signal from the mixer output;

(f) an IF amplifier which amplifies IF signal filtered by the IF filter;

(g) a local oscillator which generates fixed frequency signals to acquire desired frequency voice signals;

(h) a second mixer, being a component of an IF IC, which generates the desired voice signal by mixing the signal generated from the local oscillator and the signal amplified by the IF amplifier;

(i) a voice signal filter which passes only the desired frequency signal from output of the second mixer; and (j) a demodulator, being a component of the IF IC, which generates output signal to the voice amplifier by demodulating the output of the voice signal filter.

11. An interactive RF guidance system comprising:

a) a plurality of stationary base-sets established at a bus stop to perform functions requested by hand-held apparatus; and b) a plurality of hand-held apparatuses capable of being carried along by visually handicapped people to transmit messages to said base-sets and receive responses from them;

(a) said base-set comprising:

a microprocessor which controls overall operation of the base-set;

an antenna which transmits to and receives messages from the hand-held apparatus;

an RF module which comprises a duplexer that duplexes the transmission signal and the received signal so that the interference is avoided when using the same antenna for both of transmitting and receiving and a receiver that processes an MSK (Minimum Shift Keying) signal received from the hand-held apparatus through the antenna and duplexer to output that signal onto an MSK input amplifier, and a transmitter that modulates a voice signal that has been synthesized by the voice synthesizer chip under control of the microprocessor on demand of the hand-held apparatus and transmits that modulated signal to the hand-held apparatus through the duplexer and the antenna;

said MSK input amplifier which amplifies the MSK input signal generated from the RF module receiver to output that signal into the microprocessor;

said voice synthesizer chip which synthesizes the voice signal using the information produced by the microprocessor, to transfer the signal onto other base-sets or to output that signal through an internal speaker according to demand received from the hand-held apparatus;

a voice amplifier which amplifies the signal generated from the voice synthesizer chip and outputs that voice to a speaker;

a battery;

an ID setting switch which has multiple rotary switches and a 3-state buffer in order to set a building's own ID; and a transmitter at the RF module for a bus call; and (b) wherein said hand-held apparatus comprises:

a keypad, by which a user requests the microprocessor to execute functions and having multiple numeric keys and function keys to request execution of wished functions;

a microprocessor, which executes functions requested by the keypad and controls overall operation of said apparatus;

an antenna, which transmits and receives signals;

an RF module, which processes and outputs signals to transmit through the antenna, and processes and outputs a voice signal received through a voice amplifier;

said voice amplifier, which amplifies the received voice signal to output that signal onto an earphone under control of the microprocessor;

a battery, which supplies power to the apparatus;

a low voltage sensor, which senses low level voltage produced when voltage supplied by the battery drops under a proper level and outputs that data onto the microprocessor;

an impact sensor which senses the shock generated when the apparatus falls down to the ground and outputs that data to the microprocessor; and a buzzer and a LED (Light Emission Diode), which notify replacement time of the battery or apprise the user that the apparatus has fallen down to the ground in addition to mentioned compositions.

12. The system as claimed in claim 11, wherein said antenna is a loop antenna for full duplex having two different resonance frequencies.

13. The system as claimed in claim 11, wherein said RF module of the hand-held apparatus comprises:

(a) said transmitter, which performs necessary processing in order to transmit the MSK (Minimum Shift Keying) signal produced by microprocessor;

(b) said duplexer, which duplexes the transmission signal and the received signal so that the interference can be avoided when using the same antenna for both transmission and reception purposes; and (c) said receiver which processes the received signal from base-sets to make the sound come through voice amplifier;

said voice amplifier amplifies the low level signal produced by the receiver; and said duplexer comprising a low pass filter and band pass filter in order to reject a high frequency signal, and said low pass filter is connected to the receiver of the RF module and the band pass filter to the transmitter.

14. The system as claimed in claim 13, wherein said transmitter comprises:

(a) A PLL (Phase Locked Loop) IC which compares the phase of signal produced from a VCO to that of a reference signal using the information provided by the microprocessor to output that signal onto a loop filter;

(b) said loop filter which outputs the signal onto the VCO rejecting the high frequency signal produced when the output of the PLL IC varies abruptly;

(c) said VCO whose frequency is controlled by the output signal frequency of PLL IC;

(d) a driving amplifier which amplifies the signal to a specific level; and (e) a power amplifier which amplifies that output signal of driving amplifier to a desired level high enough to be transmitted.

15. The system as claimed in claim 13, wherein said receiver comprising:

(a) an LNA (Low Noise Amplifier) which amplifies only desired signals excluding noise from output signals of the low pass filter in the duplexer circuit;

(b) A SAW (Surface Acoustic Wave) filter which band-passes the output signal of the LNA;

(c) a local oscillator which is composed of oscillator generating signals of high frequency sufficient to generate desired IF (Intermediate Frequency) signals and a buffering amplifier stabilizing the generated signals;

(d) a first mixer which produces a desired IF signal by mixing outputs of the SAW filter and buffering amplifier;

(e) an IF filter which band-passes only the IF signal from the mixer output;

(f) an IF amplifier which amplifies IF signal filtered by the IF filter;

(g) a local oscillator which generates a fixed frequency signal to acquire desired frequency voice signal;

(h) a second mixer, being a component of an IF IC, which generates the desired voice signal by mixing the signal generated from the local oscillator and the signal amplified by the IF amplifier;

(i) a voice signal filter which passes only the desired frequency signal from output of the second mixer; and (j) a demodulator, being a component of the IF IC, which generates output signal to the voice amplifier by demodulating the output of the voice signal filter.

* * * * *